(12) United States Patent
Karul et al.

(10) Patent No.: US 8,230,354 B2
(45) Date of Patent: Jul. 24, 2012

(54) METHOD AND SYSTEM FOR PROVIDING DYNAMIC BRANDING IN A COMPUTER PROGRAM OR SUITE

(75) Inventors: Cuneyt Karul, Toronto (CA); Kun Xu, Mississauga (CA)

(73) Assignee: Echoworx Corporation, Toronto (CA)

( * ) Notice: Subject to any disclaimer, the term of this patent is extended or adjusted under 35 U.S.C. 154(b) by 800 days.

(21) Appl. No.: 11/928,489

(22) Filed: Oct. 30, 2007

(65) Prior Publication Data

US 2009/0112876 A1    Apr. 30, 2009

(51) Int. Cl.
*G06F 3/14* (2006.01)
*G06F 3/17* (2006.01)

(52) U.S. Cl. ............ 715/764; 705/9; 709/223; 717/109; 726/2; 358/1.15; 707/10; 707/100

(58) Field of Classification Search .......... 705/200–277, 705/50–79; 700/702–866; 709/201–229; 345/30–111; 348/206–231.9; 707/1, 101, 707/103, 10, 100; 715/200–277
See application file for complete search history.

(56) References Cited

U.S. PATENT DOCUMENTS

| | | | |
|---|---|---|---|
| 7,461,077 B1 * | 12/2008 | Greenwood | 1/1 |
| 2002/0184610 A1 * | 12/2002 | Chong et al. | 717/109 |
| 2006/0294578 A1 * | 12/2006 | Burke et al. | 726/2 |
| 2007/0288290 A1 * | 12/2007 | Motoyama et al. | 705/9 |
| 2008/0117448 A1 * | 5/2008 | Ijams et al. | 358/1.15 |
| 2009/0031015 A1 * | 1/2009 | Morgan et al. | 709/223 |

FOREIGN PATENT DOCUMENTS

EP    1517235 A2    3/2005

* cited by examiner

*Primary Examiner* — Ruay Ho
(74) *Attorney, Agent, or Firm* — Bennett Jones LLP

(57) ABSTRACT

A method and system for providing dynamic branding for a computer program or suite having windows, screens, display elements in a graphical interface. The system comprises a branding service module and a branding files database. The database includes a schema for storing and accessing the branding files. The branding files comprise graphical elements and/or textual elements, which can be modified and updated.

14 Claims, 6 Drawing Sheets

| ENTERPRISE | CATEGORY | NAME | LOCALE | VERSION | READ ONLY | EFFECTIVE START | EFFECTIVE END | MODIFIED BY | VALUE |
|---|---|---|---|---|---|---|---|---|---|
| DEFAULT | DC | BANNER1A.GIF | EN_US | 0 | N | 07-DEC-06 | | SYSTEM | (BLOB) |
| DEFAULT | DC | DC.IMAGE.CLOSE.GIF | EN_US | 0 | N | 07-DEC-06 | | SYSTEM | (BLOB) |
| DEFAULT | DC | RESOURCE.PROPERTIES | EN_US | 0 | N | 07-DEC-06 | | SYSTEM | (BLOB) |
| DEFAULT | DC | BANNER1A.GIF | FR_FR | 0 | N | 07-DEC-06 | | SYSTEM | (BLOB) |
| DEFAULT | DC | DC.IMAGE.CLOSE.GIF | FR_FR | 0 | N | 07-DEC-06 | | SYSTEM | (BLOB) |
| DEFAULT | DC | RESOURCE.PROPERTIES | FR_FR | 0 | N | 07-DEC-06 | | SYSTEM | (BLOB) |
| ABC | DC | BANNER1A.GIF | EN_US | 0 | N | 07-DEC-06 | | SYSTEM | (BLOB) |
| ABC | DC | DC.IMAGE.CLOSE.GIF | EN_US | 0 | N | 07-DEC-06 | | SYSTEM | (BLOB) |
| ABC | DC | RESOURCE.PROPERTIES | EN_US | 0 | N | 07-DEC-06 | | SYSTEM | (BLOB) |
| DEFAULT | DC | LOGO.GIF | EN_US | 0 | Y | 07-DEC-06 | | SYSTEM | (BLOB) |

FIG. 3(b)

METHOD AND SYSTEM FOR PROVIDING DYNAMIC BRANDING IN A COMPUTER PROGRAM OR SUITE

FIELD OF THE INVENTION

The present invention relates to computer systems and more particularly, to a method and system for providing dynamic branding for a computer program, application or suite having windows, screens, or graphical elements.

BACKGROUND OF THE INVENTION

The Echoworx Secure Services (ESS) platform and applications, Secure Mail™, Secure Dox™, and Encrypted Message eXchange™, from Echoworx Corporation (4101 Yonge Street, Suite 708, Toronto, Ontario, CANADA, M2P 1N6) offers businesses a product for secure messaging and data privacy. The Secure Mail™ product gives subscribers the capability to encrypt email at their desktop without the need to change their email address or application program. The Secure Dox™ product enables subscribers to encrypt and decrypt files on their desktop or PC. The Encrypted Message eXchange™ application provides a secure web-based portal that allows information to be shared on a secure basis.

The secure messaging and data applications from Echoworx may be implemented at a provider level or at an enterprise level. In a typical provider level implementation, an Internet Service Provider provides the Secure Mail™ service and/or Secure Dox™ service as part of a monthly pay for service for email/Internet subscribers. In a typical enterprise level implementation, the Secure Mail™ product and/or the Secure Dox™ product are installed at a corporate level on the computers of employees of the corporation and run together with the other installed applications.

One of the features of the product is the branding function. The branding function provides the capability to present customized images and/or text which appear on the various windows and messages associated with the Secure Mail™ product, the Secure Dox™ product, and/or the Encrypted Message eXchange™ application. On an enterprise level, the branding function allows a corporate to present a brand that is based on corporate needs and objectives. The branding function also allows a provider to create a brand for each of a number of enterprises.

SUMMARY OF THE INVENTION

The present invention provides a method and system for providing branding for a computer program or suite having a graphical user interface. According to one aspect, the present invention provides the capability to generate and display customized images and/or text that appear on various windows, messages, or graphical elements or components messages associated with a computer program and/or a graphical user interface for the computer program.

According to one aspect, the present invention provides a system for providing a modifiable display element on a graphical user interface having at least one window, the system comprises: a server, the server having a memory configured for storing a plurality of the modifiable display elements; a server interface configured for receiving a request from a service for one of the modifiable display elements; a module coupled to the server interface configured for processing the request and retrieving an associated modifiable display element from the plurality of modifiable display elements; and the server interface configured for transferring the associated modifiable display element to the service.

According to another aspect, the present invention provides an apparatus for providing branded display elements in a system having a graphical display interface, the apparatus comprises: a branding content database for storing branded display elements, and the display elements being stored according to a database schema; and a branding module, the branding module having, a component for retrieving the branded display elements from the branding content database; a component for modifying the branded display element; and a component for storing the branded display element in the branding content database.

According to yet another aspect, the present invention provides a database structure for storing branding files associated with an application having a graphical user interface for displaying one or more of the branding files, the database structure comprises: an identifier field for each of the branding files; a locale field for each of the branding files; and a version field for each of the branding files.

According to a further aspect, the present invention provides a method for providing a plurality of modifiable branding files for an application having a graphical user interface, the method comprises the steps of: storing a plurality of branding files in a database, the database includes a schema for storing the plurality of branding files; providing an interface for retrieving one or more of the branding files, the interface being responsive to a request received from an entity; modifying elements in one or more of the branding files and storing the modified branding files in the database; and making the branding files and the modified branding files available to the application.

Other aspects and features of the present invention will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments of the present invention, and in which:

FIG. 3(b) shows in diagrammatic form a configuration database table for storing or accessing branding files in database according to the database scheme of FIG. 3(a);

DETAILED DESCRIPTION OF THE EMBODIMENTS OF THE INVENTION

Embodiments according to the present invention are described in the context of the secure messaging and data privacy products for the Echoworx Secure Services (ESS) platform (e.g. Secure Mail™, Digital Courier™, Secure Dox™, and Encrypted Message eXchange™) available from Echoworx Corporation at 4101 Yonge Street, Suite 708, Toronto, Ontario, CANADA, M2P 1N6. It will however be appreciated that the present invention has wider applicability and is suitable for other computer program products, applications or systems having screens or windows in a graphical user interface or a Windows™ based interface.

Figure 1:
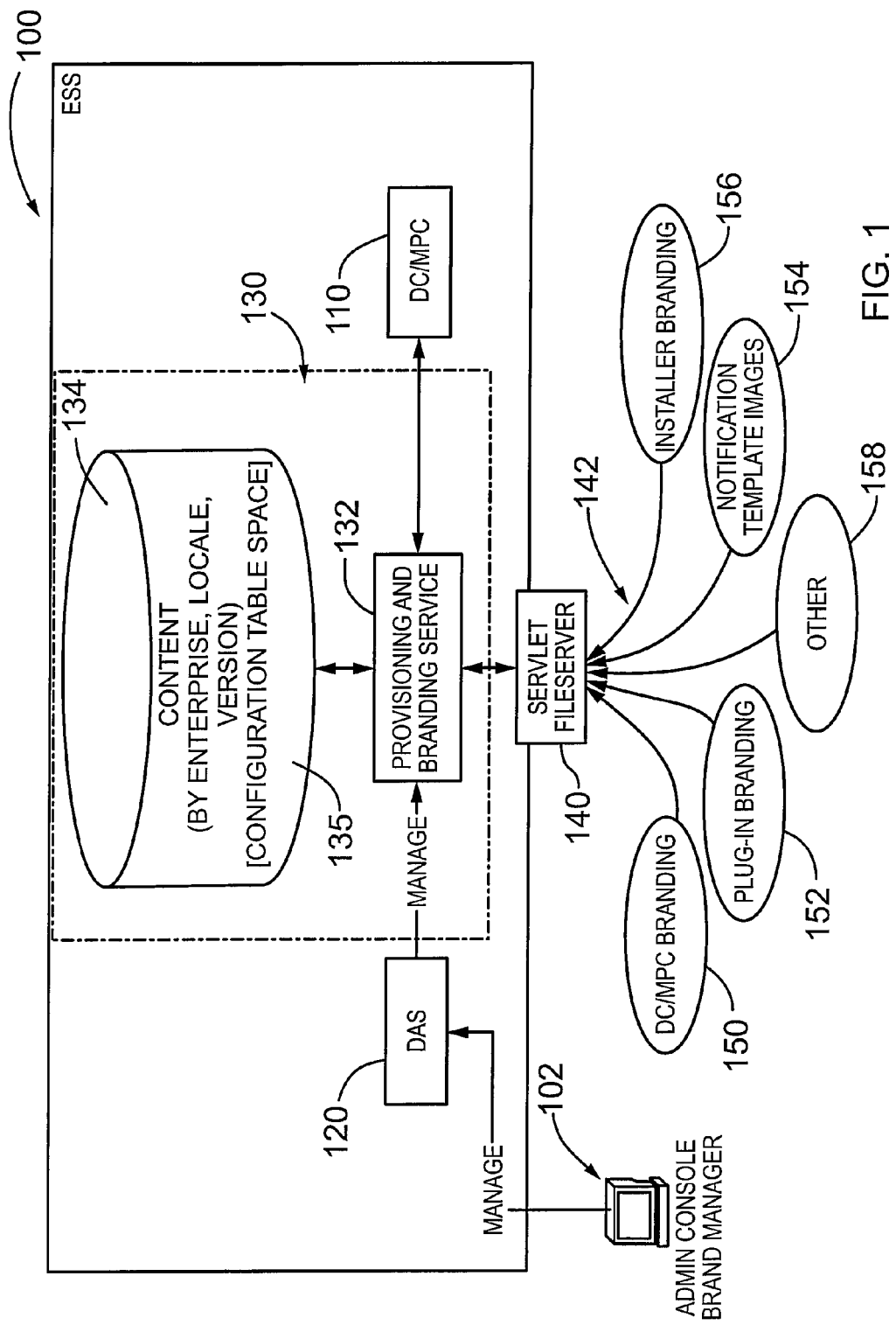
FIG. 1 shows in diagrammatic form an exemplary system incorporating a branding module or service according to an embodiment of the invention.

Reference is made to FIG. 1, which shows in diagrammatic form an exemplary system 100 for a secure communication system, such as for example, the email security application from Echoworx Corporation. The system 100 comprises a message transmission and reception module 110, a management control interface module 120, and a branding module or service according to the present invention and indicated generally by reference 130.

Branding according to one aspect comprises customizing the images and/or text that appear on the various graphical elements, e.g. windows and messages, associated with a graphical windows based software program or suite, such as for example, the Secure Mail™ and the Secure Dox™ applications associated with the Echoworx Secure Services (ESS) platform from Echoworx. An exemplary default screen for the Secure Mail™ program is shown in FIG. 2(a) and denoted generally by reference 210. Using the branding mechanism, the default screen 210 is replaced with a branded or customized screen 220 as shown in FIG. 2(b). In the branded screen 220, the default Secure Mail™ banner image 212 (FIG. 2(a)) has been replaced with a corporate banner image as indicated by 222 in FIG. 2(b). In addition, to modifying or replacing banner graphics and other graphical elements or display components, the branding mechanism provides other functions, such as, the capability to edit text or textual elements that appear on the screens (for example, the email messages in the Secure Mail™ program), and the capability to customize the online help screen available to end users. It will be appreciated that in the context of a secure email system, such as the Echoworx Secure Mail™ product, a benefit of branding is the creation of a product experience that provides a look-and-feel which reflects the uniqueness and brand of the enterprise. As described in more detail below, the branding mechanism according to the present invention provides the capability to maintain, update and manage the branding process and enterprise brand moving forward.

Referring back to FIG. 1, the branding module or service 130 implements a branding mechanism or process as described in more detail according to an embodiment of invention. As shown, the branding module or service 130 comprises two principal components according to an embodiment of the invention, a provisioning and branding service module 132 and a branding content database 134. The branding content database 134 stores branding files. As will be described in more detail below, the branding files are stored according to a database schema. The branding module 130 includes the capability to store, retrieve and manage more than one version of a branding file, and as will be described in more detail below, the appropriate version of the file is served (i.e. retrieved) based on criteria, such as a client or requestor's Enterprise or locale. According to another aspect, the branding module 130 comprises the capability to inherit a branding file from an upper class, for example, if a file is not altered for an enterprise, then the default file is retrieved. According to another aspect, the inheritance of branding files serves to reduce unnecessary duplication of files, which in turn, saves storage space and can also eliminate the need to synchronize different files. According to another aspect, the branding module 130 includes the capability for keeping a versioning history for a file, which facilitates, for example, audit operations and/or recovery from a hardware or software failure. According to another aspect, the branding module 130 provides a file structure suitable for provider level branding, for example, comprising customization of members in the structure and extension of the structure, e.g. by the addition of new folders that are associated with the enterprise. According to another aspect, the branding files are stored in a relational database, for example, in the form of binary objects, which facilitates migration, load balancing, backup, and management of the branding data.

According to an embodiment, a file server interface 140 is provided for the branding module 130. According to an embodiment, the branding module 130 operates to serve branding files over the file server interface 140 to one or more requesters. According to an embodiment, the branding module 130 receives a number of different types of requests, indicated generally by reference 142, from one more of the requesters or clients. The requests may comprise a message branding request 150, a plug-in branding request 152, a notification template images request 154, an installer branding request 156, and other types of branding requests indicated generally by reference 158. As will be described in more detail below, the branding module 130 in response to receiving a request 142 looks for the branding file (or files) associated with the request 142, and retrieves the file, or the appropriate version of file, from the branding content database 134 and serves it to the requester. For instance, for a message branding request 150, the branding module 130 determines the sender's enterprise associated with the email message, for example, using the sender email in the context requested, and then retrieves the associated template image from the branding content database 134 and serves it to the requestor via the file server interface 140. According to one aspect, the branding module 130 includes a component (for example, implemented in software or code) that determines a correct version for the file based on the context or other attributes associated with the request. According to another aspect, if a file is not found for the requester, then a default file or default version for the requestor is retrieved and served via the file server interface 140.

Figures 2, 3A:
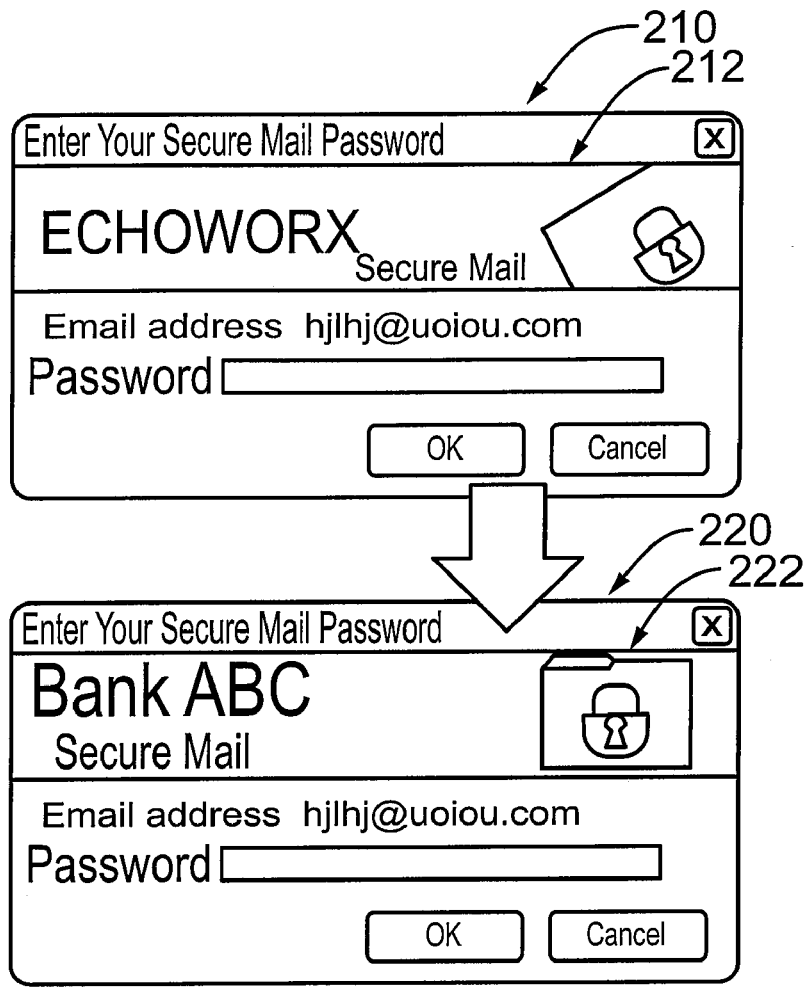
FIG. 2 shows in diagrammatic form an example of a branded window or screen for a secure email system such as that found in the Privacy Suite™ from Echoworx Corporation.
FIG. 3(a) shows in diagrammatic form a database model or schema for the branding files according to an embodiment of the invention.

According to one embodiment, the branding content database 134 comprises a configuration database table indicated by reference 135 in FIG. 1. The branding files or entries are stored in the database 134 and indexed or accessed by the configuration database table 135 for example as shown in FIG. 3(b). According to one embodiment, the branding files or entries are arranged according to a data model or schema 300 as shown in FIG. 3(a). The data model or schema 300 comprises an Enterprise Identifier field 302, a Category field 304, a Name field 306, a Locale field 308, and a Version field 310. As shown, the data model 300 may also include a Read only field 312, an EffectiveStart field 314, an EffectiveEnd field 316, a ModifiedBy field 318 and a Value field 320. It will be appreciated that the various levels of identification provided in the data model 300 allow a branding file to be searched and retrieved based on a number of criteria, as described in more detail below.

The Enterprise field 302 provides a tag or identifier for branding files or entries belonging to an enterprise, group or type. According to one embodiment, the Enterprise field 302 identifies entries (i.e. branding files) associated with a particular enterprise in a provider, wherein a provider (for example, a service provider) includes a number of enterprises. According to another aspect, the Enterprise field 302 provides a brand identifier.

The Category field 304 identifies the category or types of entries. According to one embodiment, the Category field 304 has a default value comprising a module identifier which identifies the entity that uses or request the object, i.e. the branding file or entry. For example, a module identifier is provided for the Administrative Console 102 (FIG. 1), and a module identifier is provided for the secure email application, for instance, the Digital Courier™ secure email product from Echoworx Corporation.

The Name field 306 comprises a name or identifier for the object, e.g. the branding file or entry, stored in the branding content database 154 (FIG. 1). The name or identifier is used by the requester to request the branding file. Typically, the name or identifier represents a fully qualified name.

The Locale field 308 according to an embodiment comprises a language identifier. The language identifier in the local field 308 serves to identify a geographic region, i.e. locale, that is valid for the specified language, for example, "English (United States)".

The Version field 310 identifies the version number or value of the branding file or entry. The default value is 0 (zero). According to one embodiment, the version identifier cannot be modified or deleted (for example, to provide a versioning history for archiving or recovery purposes). The current version is the highest (i.e. latest) version of a given object (i.e. a branding file or entry) or a group of objects stored in the branding content database 154. According to one embodiment, the version number comprises a number which is sequentially incremented every time a branding file is stored.

The Read only field 312 comprises a binary value which indicates whether updating of a branding file at the enterprise level by an enterprise administrator is permitted. For instance, this value indicates whether the branding file can be extended in an inheritance hierarchy, e.g. an enterprise specific version can be created, or the enterprise(s) is forced to use the default version. The EffectiveStart field 314 comprises a date that indicates when the branding file (or a particular version) was activated or created. The EffectiveEnd field 316 comprises a date that indicates when a particular version of the branding file was replaced by a newer version. According to an embodiment, the current version of the branding file does not have a value that is set. The ModifiedBy field 318 comprises an identifier, e.g. a user id, that identifies a person who modified the branding file. The Value field 320 comprises a binary value of the branding file in the form of a BLOB (Binary Large Object) object, for example, a gif or jpeg file.

Reference is next made to FIG. 3(b), which shows an example of the configuration database table 135 in the configuration database 134. As shown, the configuration database table 135 provides a data structure or a memory structure for storing and addressing branding files according to the database schema 300 of FIG. 3(a). As shown in FIG. 3(b), the configuration database table 135 comprises a row 330 for each branding file or entry. The branding files or entries are stored in the configuration database table 135 according to the database schema 300 of FIG. 3(a), i.e., the first column 342 denotes the "Group Identifier" field, the next column 344 denotes the "Category" field, the next column 346 denotes the "Name" field, the next column 348 denotes the "Locale" field, the next column 350 denotes the "Version" field, the next column 352 denotes whether the file is "Read Only", the next two columns 354 and 356 denote the Effective start and the Effective end dates, respectively, the next column 358 indicates whether/by whom the file was modified, and the next column 359 denotes the "Value of" field, e.g. a BLOB (Binary Large Object) object. According to the embodiment depicted in FIG. 3(b), the Group Identifier column 342 comprises Enterprise names.

For the example depicted in FIG. 3(b), the first row in the configuration database table 135 comprises a branding file 361 for the "Default" Enterprise 342 in the "Digital Courier" Category 344. The Name 346 of the branding file 330a is "banner1a.gif". The Locale 348 for the branding file 330a is United States English, i.e. "en_US". The Version 350 for the branding file 330a is zero (0), which means that the branding file has not been modified. The Value of column 359 indicates BLOB which means that the data file comprises a Binary Large Object or BLOB. The configuration database table 135 also includes branding files 363, 365, 367, 369, 371, 373, 375, 377 and 379 as depicted in FIG. 3(b). For example, the branding file 367 comprises a gif type file (i.e. "Name" column 346) for a banner file in the French language (i.e. "Locale" 348). For example, the branding file 373 is a branding file for "ABC" Enterprise (i.e. Enterprise Identifier 342) and comprises a gif type file (i.e. "Name" 346) for a banner file.

Figure 4:
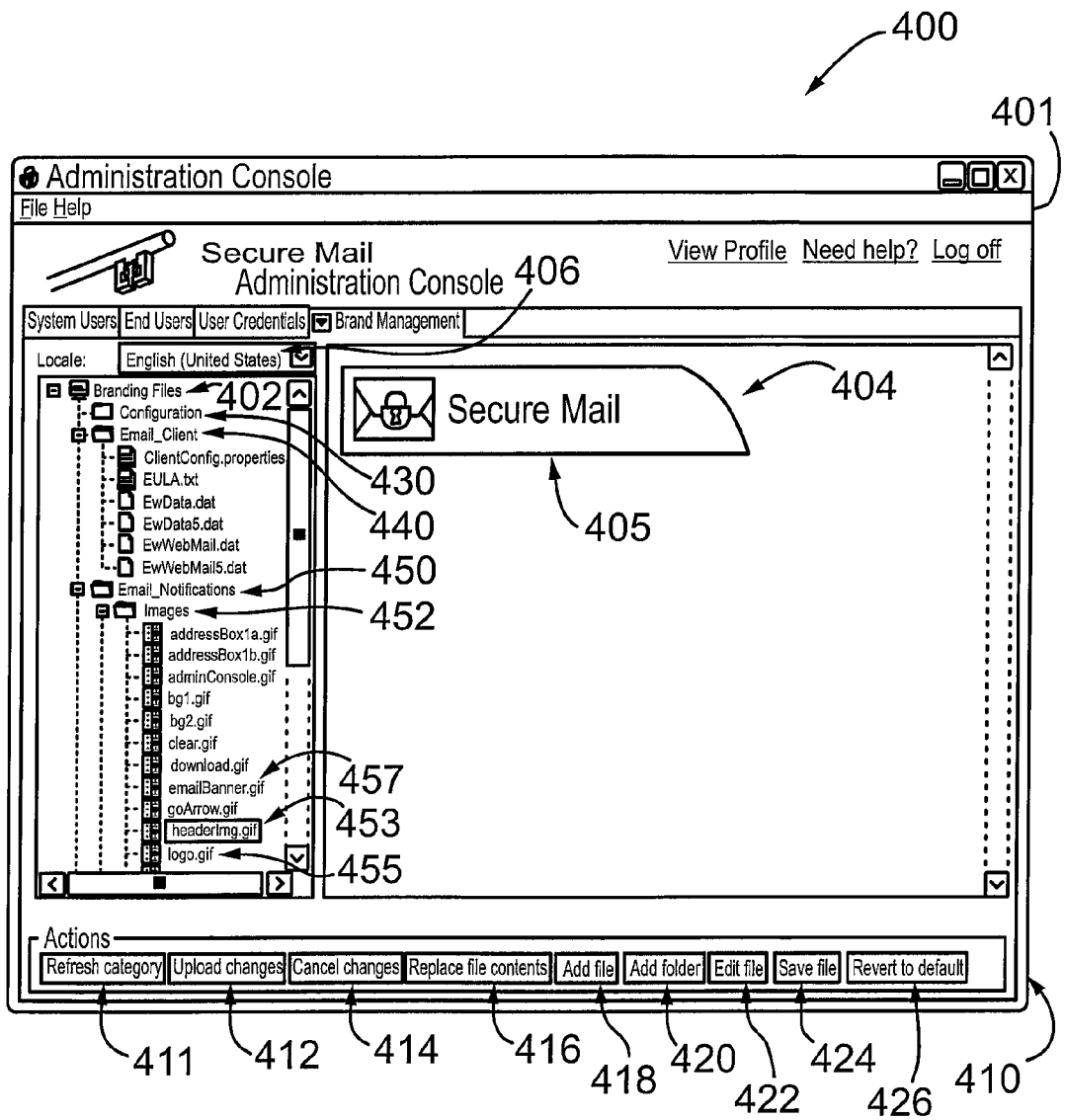
FIG. 4 shows a screen shot of an enterprise branding module or service according to an embodiment of the present invention.

Reference is next made to FIG. 4, which shows an exemplary Enterprise Brand Manager module indicated generally by reference 400 and configured with an Enterprise Brand Manager window or screen 401. The Enterprise Brand Manager module 400 is implemented in the form of software processes or functions and computer files. Any suitable programming language may be used to implement such processes and files. For the purposes of the present description, the processes and files and the like will be collectively referred to as software objects or modules, though the use of the term "object" it is not to be construed in a limiting sense, such as being strictly limited to "software objects" referred to in object oriented programming languages. Further, while software objects are described according to an embodiment of the present invention, at least some or all of the software objects can be hard-coded into central processing units and/or read only memories or other controllers configured to perform the described functionality or other non-volatile storage media in the system 100 and other components or modules depicted in the drawings.

The Enterprise Brand Manager 401 screen is displayed on the administrative console 102 (FIG. 1) and provides a graphical user interface for an administrator to perform enterprise level branding functions as will be described in more detail below. As shown in FIG. 4, the Enterprise Brand Manager screen 400 includes a Branding Files tree structure 402, a Preview window 404, and a Locale drop-down list 406. The Branding Files tree structure 402 shows or lists all of the available branding files. The Preview window 404 shows a preview of the file selected from the Branding Files tree 402. According to one aspect, preview images are for HTML, CSS, text and properties files. The Locale drop-down list 406 allows the administrator to select the language for viewing and editing during the branding function, e.g. English (United States). The branding files for the selected language appear in the Branding Files tree structure 402. According to one embodiment, the Branding Files tree structure 402 displays branding files that can be modified, e.g. the Read only field 312 (FIG. 3(a)) is set to FALSE. According to one embodiment, the branding files are marked as modifiable at the provider brand manager level, for example, as described in more detail below.

Referring again to FIG. 4, the Enterprise Brand Manager screen 400 also includes a row of buttons indicated generally by reference 410. The buttons comprise a Refresh category button 411, an Upload changes button 412, a Cancel changes button 414, a Replace file contents button 416, an Add file button 418, an Add folder button 420, an Edit file button 422, a Save file button 424, and a Revert to default button 426. According to one embodiment, the Brand Management screen 400 is implemented or configured to provide the following functionality. The Refresh category button 411 provides the capability to refresh all files under the category by downloading the latest versions from the server 134 (FIG. 1). The Upload changes button 412 uploads the locally modified files to the server and creates new versions for those files that have changed or been modified. The Cancel changes button 414 operates to disregard or cancel the local changes and replaces the locally modified files with the versions from the server 134 (FIG. 1). The Replace file contents button 416 is configured to prompt the user with a file browser in order to replace the contents of the file with a file that is selected by the user. The Add file button 418 adds a new file, and the Add folder button 420 adds a new folder. The Edit file button 422 loads the file to an editor, where the file is editable. The Save file button 424 saves a copy of the file to a local file system. The Revert to default button 426 is configured to revert to a default version of a file. For example, if a file has been modified, then clicking the Revert button 426 causes the system to revert to the default file and delete or remove the modified or specialized version of the file.

As shown in FIG. 4, the Branding Files tree structure 402 comprises groups or sets of branding files for a secure mail plug-in application or module. The branding files structure comprises a Configuration folder 430, an Email Client folder 440 and an Email Notifications folder 450. As shown, the Email Notifications folder 450 includes an Images subfolder or branch indicated by reference 452, which includes a header image file, i.e. "headerImg.gif", indicated by reference 453, a logo file, i.e. "Logo.jpg", indicated by 455, and a banner file, i.e. "emailBanner.gif", indicated by reference 457.

As described above with reference FIG. 3(b), the branding files are stored in the Branding Content Database 134 (FIG. 1) and accessed via the Configuration Database Table 135 (FIG. 3(b)). For example, the emailBanner.gif file 457 is stored as the banneer1a.gif branding file 361 in the Configuration Database Table 135 (FIG. 3(b)) and the logo.gif branding file 455 is stored as the Logo.gif branding file 379 in the Configuration Database Table 135 (FIG. 3(b)). The administrator uses the Branding Files tree structure 402 to select any one of the displayed branding files and then clicks the Refresh category button 411 to refresh, i.e. download, the selected branding file from the branding content database 134 (FIG. 1), i.e. the server. According to another aspect, the Branding Files tree structure 402 is implemented or includes the underlying functionality to permit "right clicking" of the file name to perform some or all of the file specific actions. The downloaded branding file is displayed in the Preview window 404, for example, a version of the header image for secure mail as indicated by reference 405. The Revert to default button 426 allows the administrator to download a default banner image or other default image corresponding to the selected branch in the Branding Files Tree structure 402. According to one embodiment, the Preview window 404 allows the branding file 405, e.g. graphical elements and/or images, to be edited or modified by the administrator on the administrative console 102 (FIG. 1). In accordance with another aspect, the Branding Module or service 130 includes a text editor for handling text based branding files. The edited branding file may be saved as a local file by clicking the Save file button 424 and/or the branding file may be uploaded to the branding content database 134 (i.e. the server) by clicking the Upload changes button 412. According to one embodiment, the uploading function is provided for modified files. This serves to prevent unnecessary file duplication and helps optimize performance and storage requirements for the server (i.e. the Branding Content Database 134 in FIG. 1). According to another aspect, if the administrator selects or requests a branding file that has not been modified, the Branding Service 130 provides, i.e. downloads, a default copy of the branding file.

Figure 5:
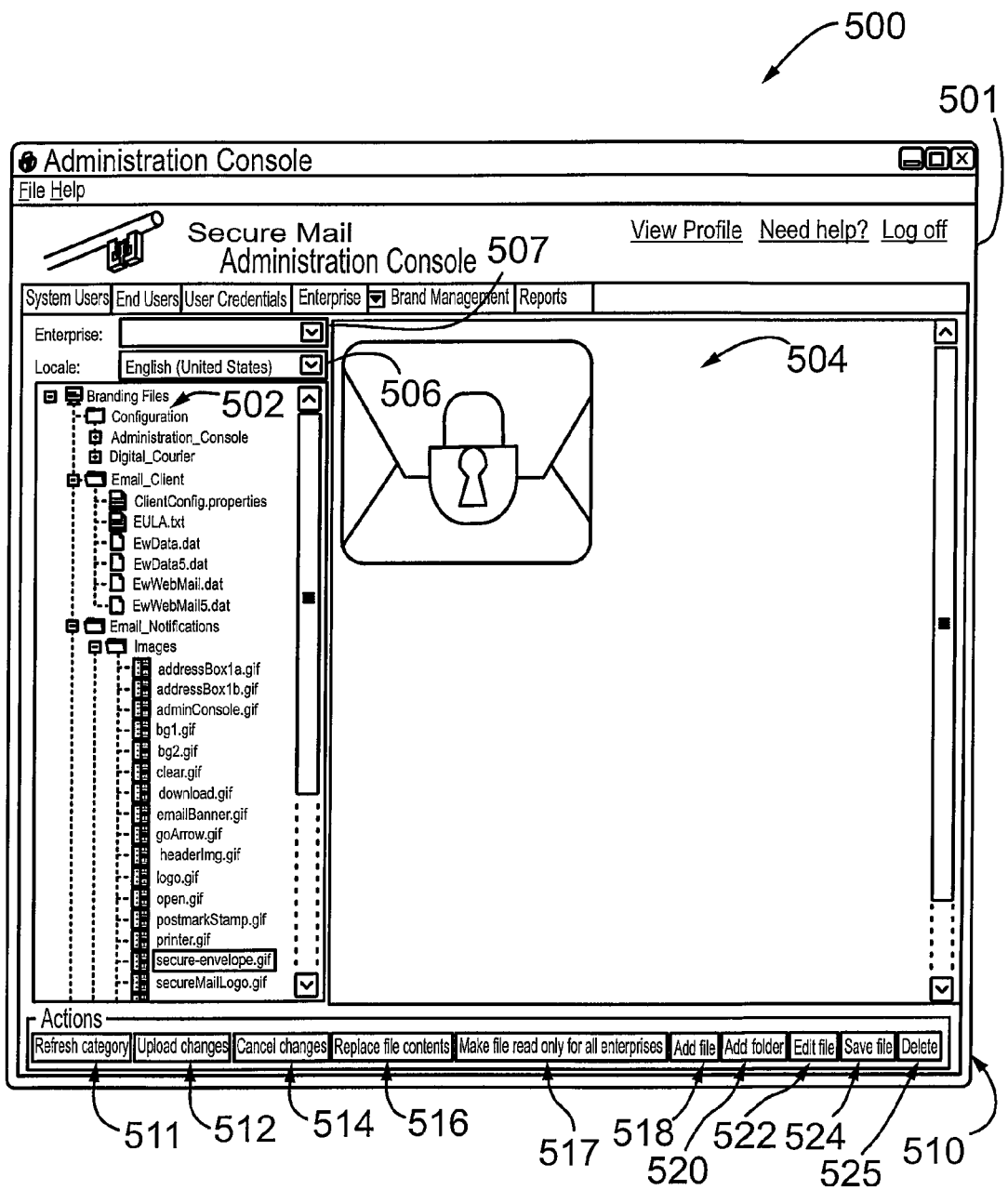
FIG. 5 shows a screen shot of a provider branding module or service according to an embodiment of the present invention.

Reference is next made to FIG. 5, which shows an exemplary Provider Brand Manager module 500 configured with a window or screen indicated generally by reference 501. The Provider Brand Manager administrator window 501 is similar to the Enterprise Brand Manager screen 401, but is intended for a provider implementation or application. In the context of the present description, an enterprise may comprise a corporate site or a departmental implementation, and a provider comprises a service provider, for example, having a number of enterprises. The Provider Brand Manager 501 screen is displayed on the administrative console 102 (FIG. 1) and provides a graphical user interface for an administrator to perform provider branding functions as will be described in more detail below. As shown, the Provider Brand Manager screen 501 includes a Branding Files tree structure 502, a Preview window 504, a Locale drop-down list 506, and Enterprise drop-down list 507. The Branding Files tree structure 502 shows or lists the available branding files. The Preview window 504 shows a preview of the file selected from the Branding Files tree 502. According to one aspect, preview images are for HTML, CSS, text and properties files. The Locale drop-down list 506 allows the administrator to select the language for viewing and editing during the branding function, e.g. English (United States). The branding files for the selected language appear in the Branding Files tree structure 502. The Provider Brand Manager screen 501 also includes a row of buttons indicated generally by reference 510. The buttons comprise a Refresh category button 511, an Upload changes button 512, a Cancel changes button 514, a Replace file contents button 516, a Make file read only button 517, an Add file button 518, an Add folder button 520, an Edit file button 522, a Save file button 524 and a Delete button 525. The buttons common to the Enterprise Brand Manager screen 400 (as described above in reference to FIG. 4) are implemented or configured to provide substantially the same functionality. The Make file read only button 517 is configured to function in conjunction with the Enterprise drop-down list 507. If an enterprise is not selected, i.e. the Enterprise drop-down list box 507 is empty, then the selected file, for example, "secure-envelope.gif", is toggled between read only and editable for all enterprises. If an enterprise is selected, i.e. an enterprise name appears in the Enterprise drop-down list box 507, then the selected file, for example, "secure-envelope.gif", is toggled between read only and editable for the selected enterprise. The Delete button 525 replaces the Revert to default button 426 (FIG. 4) and at the provider level is configured to delete the selected file.

The branding files for a provider are manipulated through the Provider Brand Manager module 500 in a manner similar to that described above for the Enterprise Brand Manager module 400 (FIG. 4), with the exception of the following functions or additional features. According to one embodiment, the Provider Branding Manager module 500 includes a component for managing default versions of the branding files. According to this aspect, the Branding Files tree structure shows the default versions of the branding files, and any modification made by Provider Branding Manager module updates the default version of the branding file. According to another aspect, the Provider Branding Manager module 500 has access to all versions of the branding files filtered by enterprise and/or locale. The Enterprise Branding Manager module 400 is given access to branding files that are registered with the respective enterprise(s).

The particular implementation details of the underlying software code objects, software and controller configurations and/or programming for implementing the described functions and operations associated the Enterprise Brand Manager module 400 and the Provider Brand Manger module 500 will be apparent to one skilled in the art.

Figure 6:
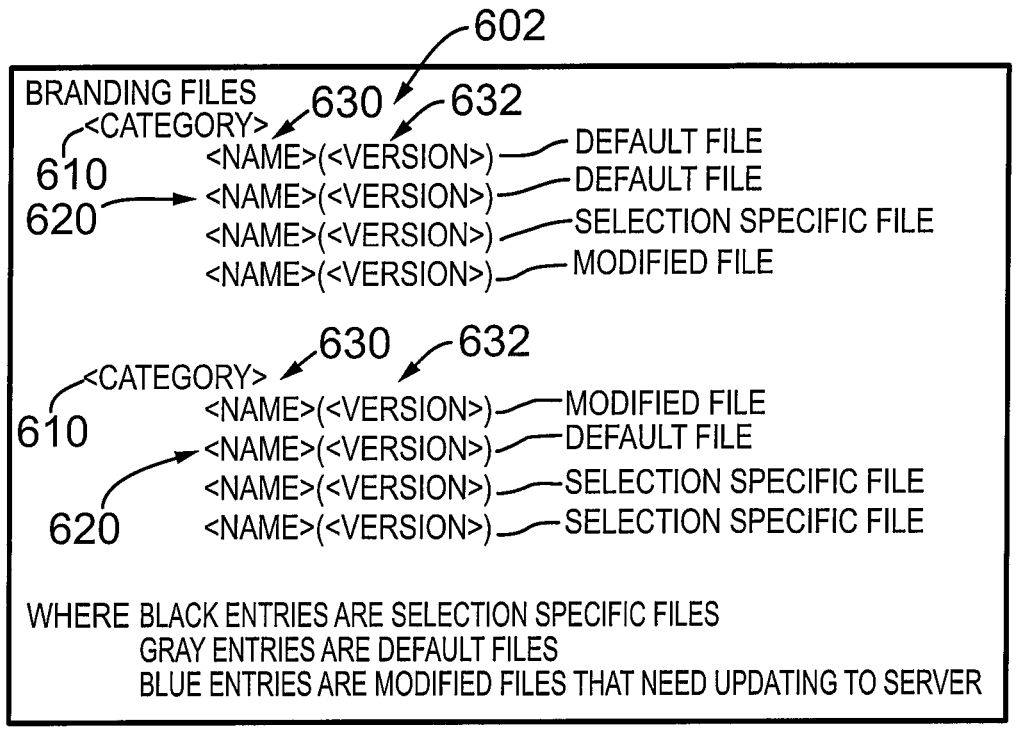
FIG. 6 shows the branding files tree structure according to an embodiment of the present invention.
Figure 7:
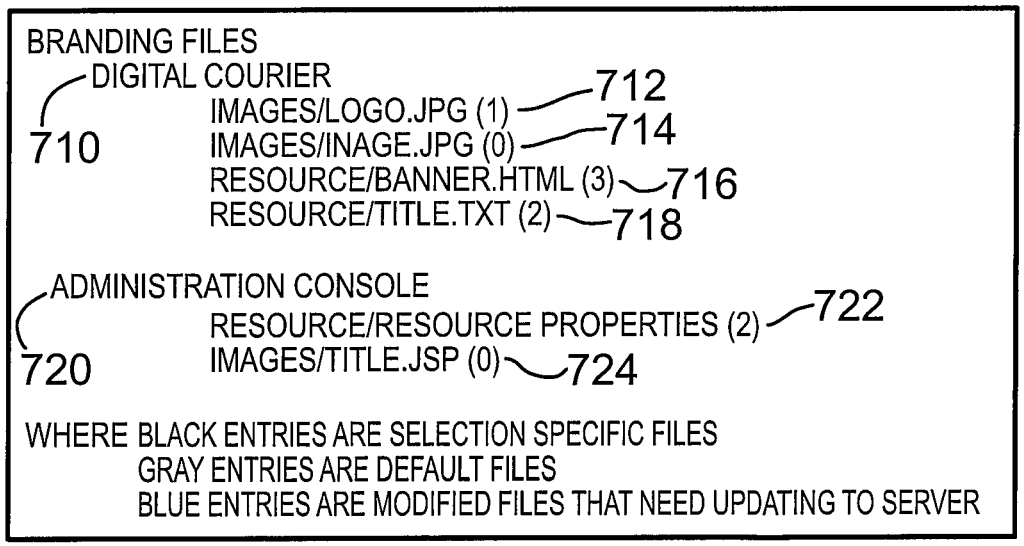
FIG. 7 shows an exemplary implementation of the branding files tree structure of FIG. 6.

Reference is next made to FIG. 6 and FIG. 7, which show an embodiment of a branding files tree structure in more detail. As shown in FIG. 6, the branding files tree structure indicated by reference 602 comprises one or more file category files, for example, which are indicated by reference 610. Each file category 610 comprises one or more branding file names indicated generally by reference 620. According to one embodiment, the branding file name 620 comprises a name field 630 and a version field 632.

As shown in FIG. 7, the categories may comprise, for example, a Digital Courier™ category 710 and an Administrative Console category 720. The Digital Courier™ category 710 comprises four branding files: an "Images/logo.jpg(1)" file 712, an "Images/image.jpg(0)" file 714, a "resource/banner.html(3)" file 716, and a "resource/title.txt(2)" file 718. The Administrative Console category 720 comprises two branding files: a "resource/resource.properties(2)" file 722 and an "images/title.jsp(0)" file 724.

According to another embodiment, a colour scheme is utilized for displaying the branding files and providing additional information about the branding file. According to this aspect, one font (or shading) colour, for example, BLACK, denotes branding files or entries in the branding files tree structure that are selection specific files, i.e. files that have been modified and therefore are no longer default files. Another font colour, for example, GRAY, denotes default branding files in the tree structure. As described above, a default file comprises a branding file or entry that has not been modified or otherwise altered. According to another aspect, a third font colour, for example, BLUE, denotes a branding file that has been modified, but not yet uploaded to the branding content database 134 (FIG. 1), for example, as described above with reference to the "Upload changes" button 412 (FIG. 4). For the example depicted in FIG. 7, under the Digital Courier category the branding files 712 and 714 are presented or displayed in GRAY font and therefore comprise default files. The branding file 716 is presented in BLACK font indicating that the file comprises a selection specific file. The branding file 718 is displayed in BLUE font indicating a modified file that has not been uploaded to the server, i.e. the branding content database 134 (FIG. 1). For the administration console category of branding files 720, the first file 722 is displayed in BLUE font meaning a modified file that has not been uploaded to the server. The second branding file 724 is displayed in GRAY font meaning a default file.

According to one embodiment, the branding module 130 is implemented as a Web service, and is made available to other services via HTTP protocol. In order to be served by the branding module 130, the requesting service provides a request having the following attributes:

(1) object identifier (i.e. common name or branding file identifier)
(2) a locale for the requesting service (i.e. for language dependent branding files or entries); optional if not language dependent
(3) identification of the requesting service (e.g. email address), which may be optional In the context of such an implementation, it will be appreciated that the requesting service will have prior knowledge of the object identifiers (i.e. branding file names) and/or the branding content database 134 (FIG. 1). As described above, it is possible to have multiple copies or versions of an object or branding file in the content database 134. For example, a branding file can have multiple versions as a result of the following:

(1) multiple enterprises with the enterprises having their own version or "flavor" of the default branding file available from the server
(2) multiple language versions in one enterprise for the same object (i.e. branding file or entry)
(3) identifier for the requested branding enterprise (e.g. enterprise name, enterprise id, email address, etc.)

According to another aspect, the branding module 130 includes a function or component (i.e. is configured) for processing a request as follows:

(1) analyzing the request to determine if any of the additional attributes for the file have been provided other than the file identifier. If the file identifier is the only attribute, then the latest version of the requested file is returned
(2) if other attributes are provided, then the attributes are analyzed to determine the most specific version of the file that matches the requested criteria. The attributes are ordered from more general to more specific and according to an embodiment comprise: default, enterprise, and language. In each case the latest version of the most specific file is served.

In operation, the branding module 130 returns or transfers a copy of the requested object (i.e. branding file) to the requesting service. The user (e.g. administrator) is then free to edit or otherwise modify the branding file (e.g. add and/or change graphical elements and/or textual elements), and then save the modified file to the server (or save locally).

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A system for providing branded display elements in an application for one or more clients, said system comprising:
a branding content database for storing branded display elements, and said branded display elements being stored according to a database schema, said branding display elements including one or more default files, and said branding content database being configured to store one or more versions of said branded display elements, wherein said one or more versions are defined according to said database schema and retrievable in response to a branding request; and
a branding module having, a component configured for retrieving one of said branded display elements from said branding content database in response to a branding request from the application and component being configured to provide one of said default files in response to a branding request when said one or more default files remain unaltered;

a component configured for configuring said branded display element for a graphical display associated with the application; and a component configured for associating said branded display element with the application according to said database schema and storing said branded display element in said branding content database.

2. The system as claimed in claim 1, wherein said graphical display associated with the application comprises a screen generated by the application and said branded display element is embedded in said screen and displayed together with said screen in operation of said application.

3. The system as claimed in claim 1, wherein said branding request comprises one or more of a message branding request, a plug-in branding request, a notification template images request and an installer branding request.

4. The system as claimed in claim 1, wherein the application is provided by an application provider, and said application provider comprises a plurality of enterprises, and said branding elements are configured to be inherited by said plurality of enterprises from said application provider.

5. The system as claimed in claim 4, wherein said branding module is configured for a server, and said branding content database is operatively coupled to said server, and said server including a network interface for receiving said branding requests.

6. A system for providing branding files in an application for a plurality of clients and each of said one or more clients having one or more selection criteria, said system comprising:

a branding content database for storing the branding files, said branding files being arranged in a tree structure comprising selection specific branding files and said selection specific branding files including a default version for the branding files; and a branding module having, a component configured for retrieving one of said branding files from said branding content database in response to a request from one of the clients and said branding file being selected based on the selection criteria associated with the client; and a component configured for configuring said branding file for a graphical display associated with the application.

7. The system as claimed in claim 6, wherein said selection specific branding files comprise a default version for the branding files, and said component configured for retrieving is configured to retrieve said default version when said selection criteria comprises a file identifier attribute.

8. The system as claimed in claim 7, wherein said selection specific branding files comprise a plurality of enterprise specific branding files and a plurality of language specific branding files, and said selection criteria further includes an enterprise attribute and a language attribute.

9. The system as claimed in claim 8, wherein said component configured for retrieving is configured to retrieve said default version in the absence of said enterprise attribute or said language attribute in a request from one of the clients.

10. The system as claimed in claim 8, wherein said enterprise specific branding files comprise one or more versions or one or more copies for each of said enterprise specific branding files, and said component for configuring is configured to retrieve a latest version of said enterprise specific branding file in the absence of said enterprise attribute.

11. The system as claimed in claim 7, wherein said tree structure is configured to store one or more of default branding files, branding files that have been modified and branding files that have been modified and yet to be uploaded to a branding file server.

12. The system as claimed in claim 11, wherein said branding module is configured for said branding file server, and said branding content database is operatively coupled to said server, and said server including a network interface for receiving said branding requests from the one or more clients.

13. The system as claimed in claim 6, further comprising a component for saving a branding file that has been modified in the branding content database with a new version identifier.

14. The system as claimed in claim 6, wherein said branding request comprises a message branding request comprising an email address, and identity of the requesting client is derived from said email address for determining a selection criteria for selecting one of said branding files stored in said branding content database.

* * * * *